United States Patent [19]
Shay

[11] 4,310,607
[45] Jan. 12, 1982

[54] BATTERY CELL CONSTRUCTION

[75] Inventor: George C. Shay, Corning, N.Y.

[73] Assignee: Corning Glass Works, Corning, N.Y.

[21] Appl. No.: 167,423

[22] Filed: Jul. 11, 1980

[51] Int. Cl.³ .......................................... H01M 10/39
[52] U.S. Cl. .................................. 429/104; 429/185; 429/193; 29/623.1
[58] Field of Search ............... 429/104, 191, 193, 185

[56] References Cited
U.S. PATENT DOCUMENTS

| | | | |
|---|---|---|---|
| 3,476,602 | 11/1969 | Brown et al. | 429/104 |
| 3,679,480 | 7/1972 | Brown et al. | 429/104 |
| 4,112,203 | 9/1978 | Anand | 429/104 |
| 4,137,376 | 1/1979 | Clegg et al. | 429/104 |
| 4,230,778 | 10/1980 | Bendo et al. | 429/104 |

FOREIGN PATENT DOCUMENTS 2017391 10/1979 United Kingdom .

*Primary Examiner*—Donald L. Walton
*Attorney, Agent, or Firm*—Burton R. Turner; John P. DeLuca

[57] ABSTRACT

A cell for generating electric energy is provided comprising a sealed container partitioned into anode and cathode chambers, said partition comprising an electrolyte/separator in the form of a bundle of hollow glass or ceramic fibers, fusion sealed together between their interstices adjacent at least one end thereof. Preferably, the ends of the fibers which project within the anode chamber are sealed closed whereas the opposite ends are in open communication with the cathode chamber. Preferred anode and cathode materials comprise an alkali metal such as sodium or potassium and sulfur respectively.

18 Claims, 15 Drawing Figures

BATTERY CELL CONSTRUCTION

BACKGROUND OF THE INVENTION

Recent battery technology, such as is set forth in U.S. Pat. No. 3,476,602 discloses the use of a molten alkali metal anode/anolyte and a molten sulfur/alkali metal sulfide catholyte separated by an alkali metal ion-permeable membrane/electrolyte. A cathodic current collector, or "cathode" is immersed in the catholyte. When the anode and cathode are connected through an external electrical circuit, the electrons are discharged to the circuit from the anode with the formation of positively charged alkali metal ions. These ions migrate through the membrane into the catholyte. Negatively charged sulfide (polysulfide) ions are formed in the catholyte by interaction of sulfur at the cathode surface with electrons received from the external circuit.

In one embodiment of such a battery, the membrane is in the form of a multiplicity of sodium-filled hollow glass fibers closed at one end and open at the other. The open ends of the fibers communicate with a reservoir of molten sodium and the fibers are immersed in a molten polysulfide catholyte, with the anolyte (sodium) and catholyte being separated by a tubesheet or header which encompasses a portion of the fibers in a sealing arrangement. That is, the glass and glass-ceramic hollow fibers or other electrolyte separators are sealed in place as a bundle in a header by adhesives such as glazing or potting compounds, solder glass, and the like materials. A large anode area may be afforded by closely spacing a large number of the fine hollow fibers in a given cell or battery volume.

U.S. Pat. No. 4,112,203 discloses a battery cell having a large number of fine hollow glass fiber lengths, with their lower end closed and their upper ends open, passing through a tubesheet in sealing arrangement therewith. The open ends of the fibers communicate with a molten alkali metal in an anolyte cup and the portions of the fibers below and depending downwardly from the tubesheet are immersed in a corresponding alkali metal polysulfide melt. The fiber lengths are disposed generally parallel to one another in a continuous spiral of generally concentric vertical rows and constitute a generally cylindrical bundle.

Disposed between the rows of fibers within the bundle and wrapped around the bundle at least once is a cathodic current collector consisting of a thin, flexible, elongated sheet of metal or metal alloy, such as aluminum foil, preferably protectively coated with graphite or molybdenum disulfide. The cathode sheet may be pierced by perforations to facilitate catholyte flow into and out of the spaces between the cathode sheet and the fibers, and the sheet is suitably connected to a catholyte lead for connecting the battery cell to an external electrical circuit. In a like manner, an anode lead passes through the top of the anolyte cup and is utilized to connect the battery cell to an external electrical circuit.

The tubesheet or header of the prior art which joins the hollow fibers together and provides a seal between the sodium anode and the sodium sulfide cathode chambers, is generally formed of a frit or solder glass material which is softer than the hollow capillary fibers. When the frit or solder glass is fired, it fuses into a porous mass and seals to the outer walls of the hollow fibers without softening the fibers, however the porous nature of the resulting tubesheet promotes leakage, and the expansion difference between the tubesheet glass and the glass of the fibers promotes the breakage of such fibers. Further, the softer tubesheet glass may yield or flow excessively at battery cell operating temperatures which may be in excess of 300° C. in larger sized cells. Further, in view of the aluminum foil interposed between rows of such capillary fibers, the bundle of fibers is rather fragile since each fiber is only connected at one end to the tubesheet and hangs freely downwardly therefrom.

United Kingdom patent application No. GB2017391A, published Oct. 3, 1979, entitled A Sodium/Sulphur Cell, addresses itself to the problems of suspending a plurality of hollow open ended fibers from a tubesheet, and proposes to overcome such problems by positioning a metal wire within each fiber and sealing the fibers at both ends, with the metal wire embedded within and projecting outwardly from at least one sealed end of the fiber. As pointed out by the published application, an appropriate connection can be made between the sealed fiber and a closing plate for the cell in a manner capable of withstanding great mechanical strain and with fewer breakage problems, by closing the end of the fiber to be sealed and by sealing the conductor wire in the closed end and into the closing plate. It is thus possible, according to the published application, to fusion seal one closed end of the fiber having a wire passing therethrough directly to a closing plate for the battery cell. Thus, each fiber becomes an individual closed chamber, which chambers are not in open communication with one another.

It thus has been an object of the present invention to provide an alkali metal/sulfur cell or battery in which the standard tubesheet which separates the anolyte and catholyte is eliminated as such, by fusing the outer walls of hollow fibers forming the ion-permeable electrolyte together as a solid sealing mass adjacent open ends thereof, in such a manner so as to fill the interstices between such fibers with the glass composition of the fibers while retaining the interiors of such fibers in open communication with an adjacent chamber.

A further object of the invention has been to provide an alkali metal/sulfur cell or battery wherein the hollow fibers of the bundle forming the ion-permeable membrane or electrolyte are sealed together along adjacent portions of their longitudinal extent intermediate their ends to form a rigid fiber bundle, and such fibers are each provided internally with a cathode lead or cathodic current collector in the form of a wirelike member.

SUMMARY OF THE INVENTION

The battery assembly of the instant invention comprises a sealed container, which is divided or partitioned into mutually exclusive anode and cathode chambers. Partitioning of the anode and cathode chambers is achieved by means of a solid electrolyte-membrane, sometimes also referred to herein as the electrolyte or separator, in the form of a plurality of hollow fine fibers or capillaries held together as a bundle and sealed together along portions of their length so as to provide rigidity and give the bundle mechanical integrity. In a preferred embodiment, the hollow fibers or capillary tubes are sealed closed at one end which projects within the anolyte chamber, and are in open communication at the other end with the catholyte chamber. However, the interstices between the hollow fibers or capillary tubes are fused together adjacent such open ends to form a solid sealing mass about such open ends so that the capillary tubes themselves form a uniform continuous electrolyte separator between the anode and cathode chambers. The hollow part of the capillary tubes, being in open communication with the catholyte chamber, is filled to a desired level with the catholyte, and a cathodic current collector wire is positioned within each such hollow capillary tube and passes outwardly through the open end and is connected to a cathode lead assembly. The bundle of hollow fibers or capillary tubes, being sealed together along a portion of their contact length beyond the solid sealing mass, provide a rigid fiber structure having improved structural integrity.

The electrolyte/separator as it is known, is usually made of a material such as a polycrystalline ceramic, amorphous glass or an impregnated matrix, the latter having embedded therein an essentially nonmigrating salt or liquid which is permeable only to the anode metal ion. The electrolyte (separator) is further characterized as transmitting ions of the alkali metal anode between the anode and cathode chambers but as being substantially non-conducting to electrons. A liquid alkali metal, such as sodium or potassium, is contained within the anode chamber, whereas the cathode chamber contains a reducible material, such as sulfur.

DESCRIPTION OF THE PREFERRED EMBODIMENTS

The battery cells of the present invention may be fabricated as a complete unit comprising the electrolyte (separator) and electrodes in a liquid and vapor tight container. Conveniently, the electrolyte/separator may be sealed within a container to provide separate anode and cathode chambers or compartments. The outer case or container, or at least a portion thereof comprising one of the compartments, may be fabricated from an electron conducting material and of a structural stability such that it does not degrade or detrimentally react with battery components during operation. The use of an electron conducting material facilitates a ready connection of collector lead wires. Further, to assure optimum efficiency, the case is preferably covered with a thermal insulating material to minimize heat losses both during cell operation and offduty storage, or alternatively a jacket of insulating material having heating wires or other heating elements adjacent the case may be used to cover part or the entire battery cell.

A preferred anode-cathode electrolyte system of the present invention comprises a liquid sodium anode and liquid sulfur-sodium sulfide mixture as the cathode system, e.g. a sodium polysulfide, and a sodium ion conductive glass or ceramic electrolyte. The system is capable of producing energy densities of over 300 watt hours per pound at operating temperatures as low as 330° C.

The term anode is used herein in accordance with recognized electrochemical and electrical engineering practices, and denotes, when the cell is acting as a battery, i.e., delivering current to a load, the electrode at which current enters the cell. The term cathode denotes the electrode at which current leaves the cell.

Details as to fiber materials forming the separator, catholyte compositions, anolyte compositions, housing sealing glasses, and known assembly methods suitable for the practice of the present invention are given in U.S. Pat. Nos. 3,476,602; 3,679,480 and 4,112,203.

However, whereas the hollow fibers or capillary tubes forming the electrolyte separator bundle of the prior art were sealed in place as a bundle in a header or tubesheet by adhesives such as glazing or potting compounds, solder glass, high temperature thermal setting resins and like materials, the walls of the capillary tubes or fibers of the present invention are fused together as a sealing mass adjacent their open ends, so that the interstices between adjacent tubes are eliminated and sealed off, thus forming a uniform glass or glass-ceramic composition for virtually the entire separator bundle which separates the anode and cathode chambers. In addition, since there is no current collector positioned between adjacent fibers or capillary tubes, the fibers forming the separator bundle of the present invention are sealed together along portions of their lengths beyond the sealing mass so as to provide the bundle with structural integrity.

Figure 1:
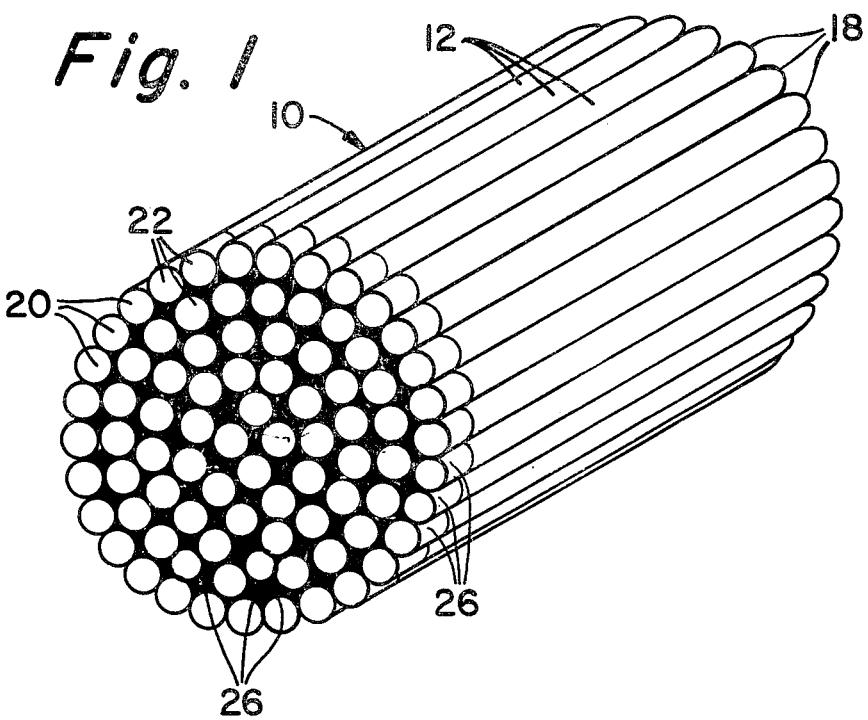
FIG. 1 is a schematic perspective view of a bundle of hollow fibers or capillary tubes embodying the invention wherein the interstices between such tubes are sealed together adjacent the open end of the tubes.
Figure 2:
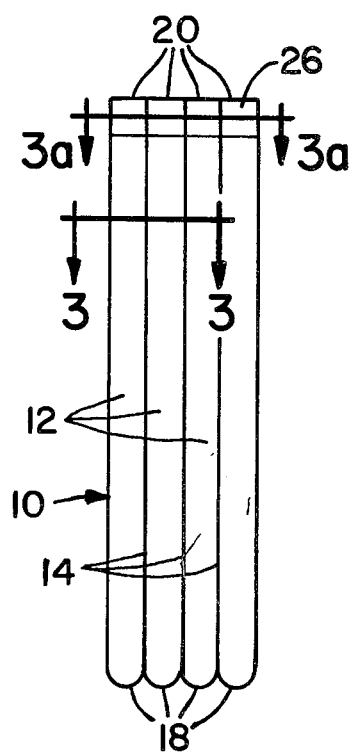
FIG. 2 is a schematic side elevational view of a portion of the capillary tubular bundle shown in FIG. 1 illustrating the fusion sealing of the spaces between the tubes adjacent the open end of such tubes.
Figure 3:
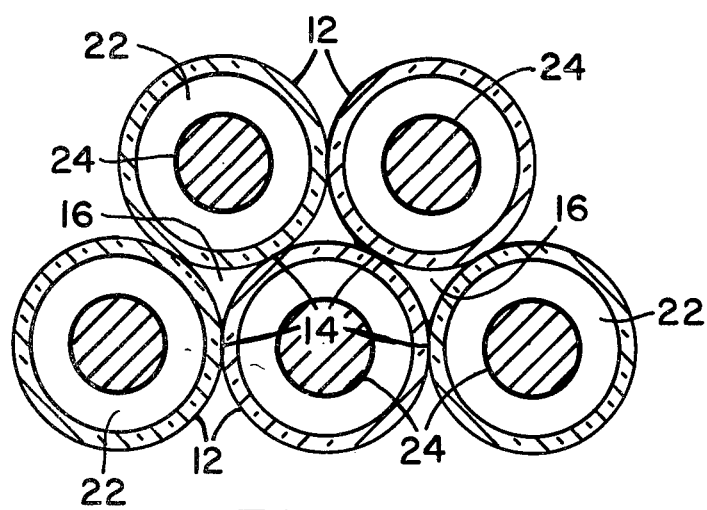
FIG. 3 is a greatly enlarged fragmental sectional view of a portion of the bundle of FIG. 2 while looking along lines 3—3 of FIG. 2, but with the addition of collector wires within the capillary of the fibers or tubes forming such bundle.

Referring now to FIGS. 1, 2, 3, 3a and 3b, a separator bundle 10 is shown comprising a plurality of hollow fibers or capillary tubes 12 sealed together along at least portions of their lengths at adjacent contact areas 14 leaving open interstices 16 therebetween. The tubes 12 each have a closed or sealed off end 18 and an open end 20. The open end communicates with the hollow capillary interior 22, which as shown in FIG. 3 is provided with a current collector 24 which may be in the form of a protectively coated aluminum wire. The end of the bundle 10 adjacent the open end 20 of the hollow fibers or capillary tubes 12 is fused together between the fibers forming the bundle. Thus the spaces or interstices between the walls of the fibers or tubes forming such bundle are sealed off and a solid sealing mass 26 is formed between such fibers adjacent the open ends thereof. The solid sealing mass 26 firmly and rigidly positions the fibers and forms a uniform composition seal of the same glass as the hollow fibers between the anode and cathode compartments of the cell, which are separated by the tubular electrolyte bundle 10, and therefore there is no thermal expansion mismatch between the fibers and the sealing mass which could cause cracking or fracture upon heating to or cooling from the operating temperature of the cell. The sealed contact portions 14 extend along portions of the length of fibers 12 beyond sealing mass 26.

The bundle of hollow capillary fibers or tubes formed in accordance with the present invention may be assembled into a battery in a variety of structural embodiments. For example, in the embodiment shown in FIG. 4, the separator bundle 10 is mounted in an upright position with the closed sealed off ends 18 of the hollow fibers or capillary tubes 12 at the bottom of the bundle projecting into an anode chamber 28 of the battery cell 30, and the open ends 20 of the fibers 12 are in open communication with a cathode chamber 32. The anode chamber 28 is formed within an enclosing housing or container 34 which may be of metal such as stainless steel, whereas the cathode chamber 32 is formed within a container or housing 36 which may be of a glass or glass-ceramic material. The anode chamber 28 is provided with an anolyte 38 of molten alkali metal, such as for example sodium, within which the closed end 18 of the hollow glass fibers or capillary tubes 12 project. Accordingly, the anolyte 38 flows within the interstices 16 about the outer surface of the hollow fibers 12, as shown in FIG. 3b. The cathode chamber 32 is open to the hollow interiors 22 of fibers 12, which are shown in FIG. 3b are provided with a molten catholyte 40 such as a molten sodium polysulfide composition.

A plurality of cathodic current collector wires 24, which may be protectively coated aluminum wires, extend outwardly from the open ends 20 of hollow interiors 22 of the hollow fibers or tubes 12 and are pressed together at their outer ends to form a common electrode connector 42 which is connected to a cathode lead 44 extending through the cathode housing 36 by means of a connecting strap 46. In a like manner, an anode lead 48 may extend through the anode housing 34 into the anolyte 38 where housing 34 is of a non-conducting material, with the cathode lead 44 and the anode lead 48 being utilized to connect the battery cell 30 to an external electrical circuit. However, where housing 34 is of a conducting material, such as stainless steel, the housing itself may function as the electrode.

Figure 3A:
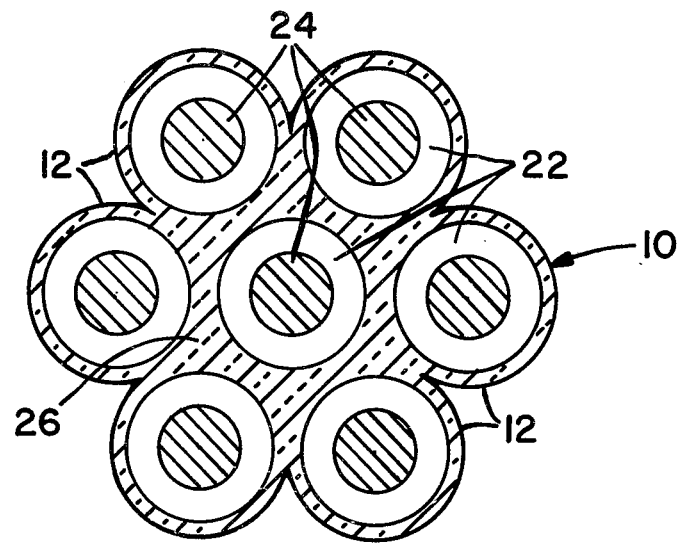
FIG. 3a is a greatly enlarged fragmental sectional view of a portion of the bundle of FIG. 2 while looking along lines 3a—3a of FIG. 2, but with the addition of collector wires within the hollow interiors of the fibers forming such bundle.
Figure 3B:
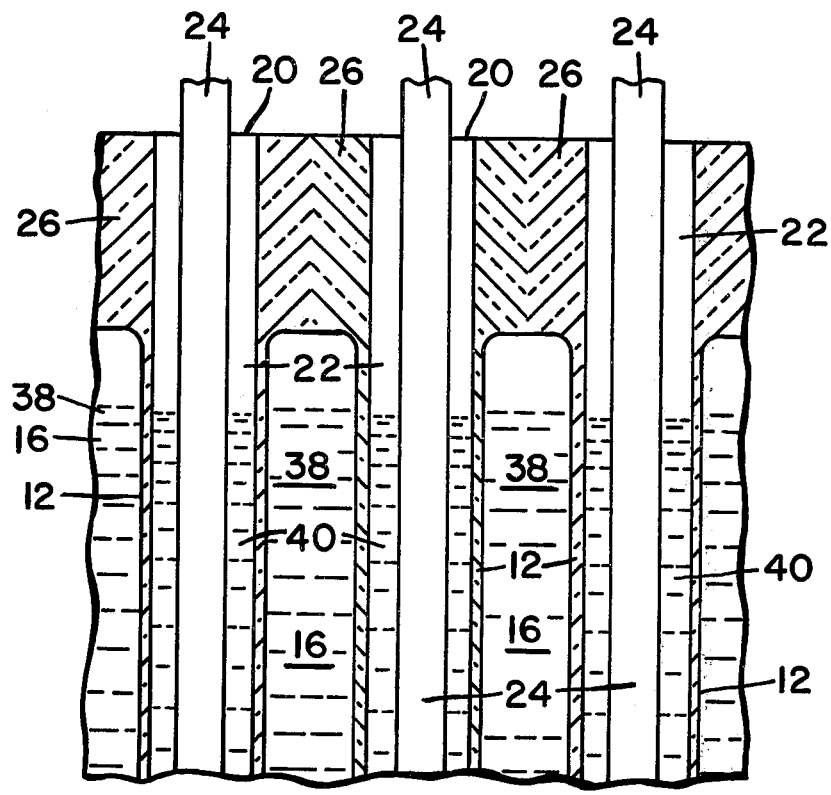
FIG. 3b is a greatly enlarged fragmental elevational view in section of an upper portion of the bundle shown in FIG. 2, but with collector wires within the fibers.

The hollow fibers or capillary tubes 12 forming the separator bundle 10 are rigidly fused together between their interstices as a solid mass 26 adjacent their open ends 20 which are in open communication with each other and cathode chamber 32 and are provided with catholyte 40 (see FIGS. 3a and 3b). The catholyte 40 flows into the hollow interiors 22 of the capillary tubes 12 and surrounds the cathodic current collector wire 24 positioned within each such tube. The separator bundle 10 is sealed to an inner surface of the cathode housing 36 with any known suitable sealing glass 50 such as an anhydrous boric oxide glass modified with 2–3% soda and silica to match thermal expansions, to provide a glass-to-glass seal between the container 36 and the peripheral portions of the solid sealing mass 26 retaining the fibers or tubes 12 of the separator bundle 10. In a like manner, the anode housing 34 is sealed to an outer surface of the cathode housing 36 by suitable sealing glass 52, similar to sealing glass 50, to provide a glass-to-metal seal between the anode and cathode housings.

Figure 4:
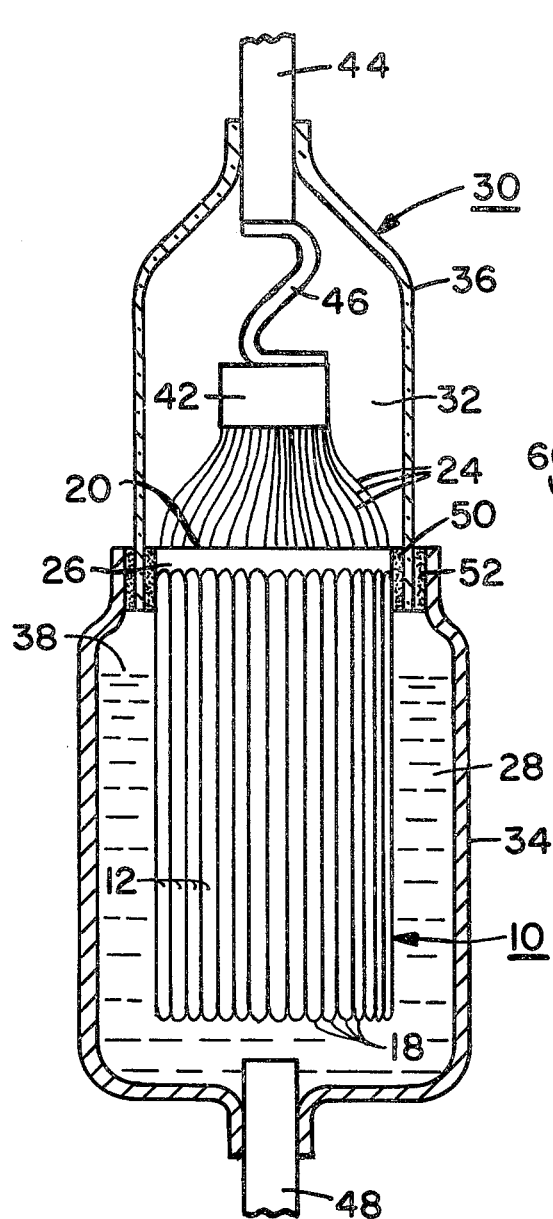
FIG. 4 is a schematic sectional view in elevation of a battery cell embodying the present invention.
Figure 5:
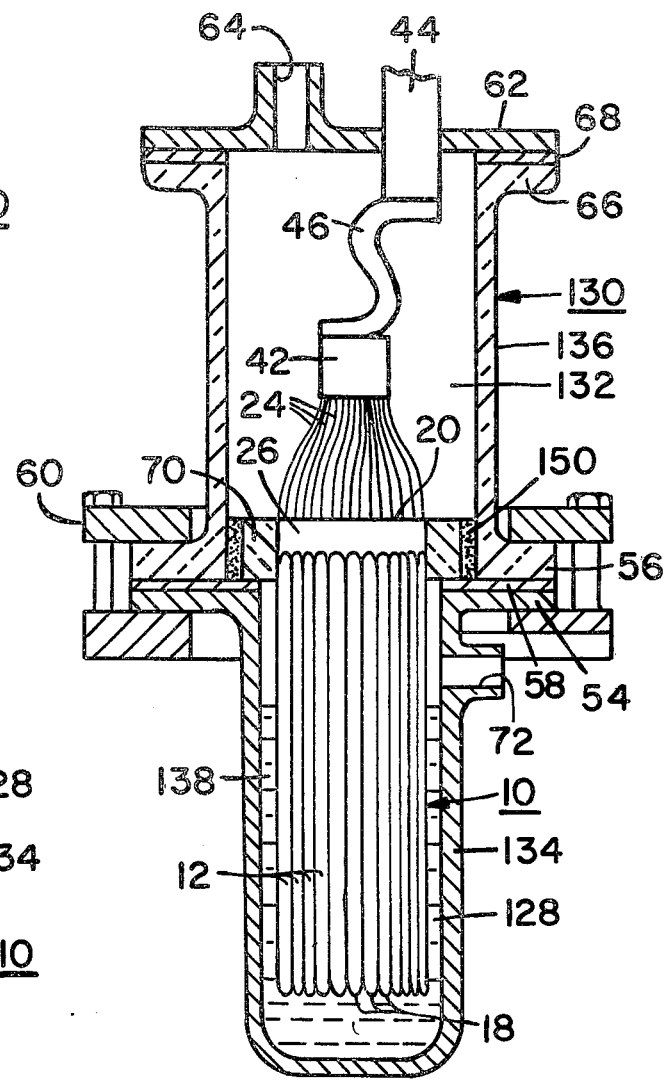
FIG. 5 is a schematic sectional view in elevation of a further embodiment of a cell in accordance with this invention.

The battery cell 130 shown in FIG. 5, is similar to that shown in FIG. 4 with the major difference being in the sealing means between the anode and cathode housings. As shown, the anode housing or container 134 and the cathode housing or container 136 are each provided with mating opposed flange portions 54, 56, respectively, having a suitable gasket 58 positioned therebetween. A compression seal is effected between the flanges 54 and 56 of the anode and cathode housings 134, 136 by any suitable means such as a conventional pipe coupling or clamping means 60. The upper end of the cathode container 136 is provided with a cover member 62 having an inlet opening 64 projecting therethrough. The cover member 62 is positioned upon an upper peripheral flange portion 66 of the cathode housing 136 with a suitable sealing gasket 68 positioned therebetween and provided with a compression seal by any suitable means, such as the coupling 60.

The separator bundle 10 is secured to an inner surface of the glass or glass-ceramic cathode housing 136 adjacent the fused solid sealing mass portion 26 by means of a suitable sealing glass 150 providing a glass-to-glass seal. Although the housing 136 may be sized or contoured at its lower extent to snugly accommodate the outer periphery of the separator bundle 10, a glass sealing ring 70 may be utilized to accommodate the bundle 10 within the container 136 where desired. The sealed end 18 of the hollow fibers 12 forming bundle 10 project downwardly within an anolyte 138 contained within anode chamber 128 of anode housing 134. The anode housing or container 134, which is formed of a suitable metal, functions as an anode electrode lead, and is provided with an opening 72 for supplying the anolyte 38 which flows within the interstices 16 about the outer walls of the hollow fibers 12. Fill openings 64 and 72 are of course sealed off by known suitable means after filling has been accomplished.

The hollow interiors 22 of the fibers 12 have a catholyte 40 retained therein and communicate at their opened ends 20 with each other and the cathode chamber 132 of cathode housing 136. A plurality of current collector wires 24, which are surrounded by the catholyte and project outwardly from within the hollow interiors of capillary tubes 12, extend upwardly from the open ends 20 of such tubes and are formed into a common electrode connector 42 which is connected by a strap 46 to a cathode lead 44 extending through an opening in cover 62.

Figure 6:
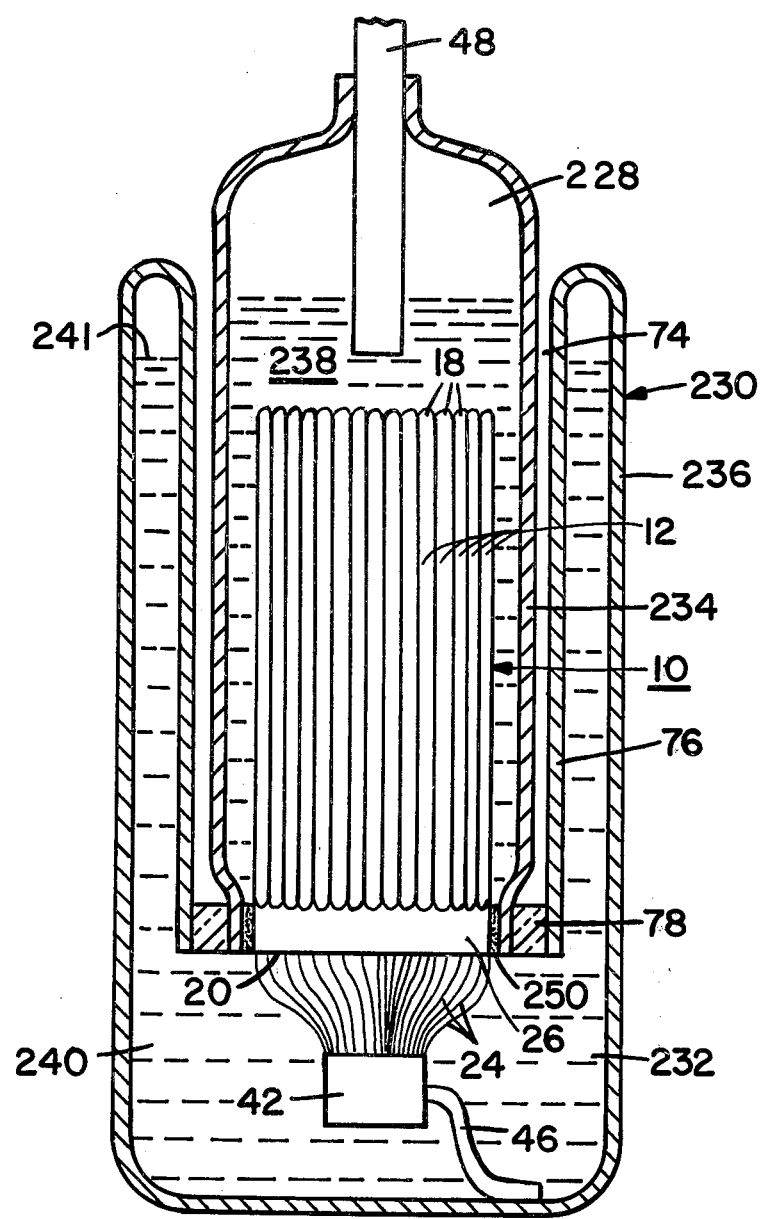
FIG. 6 is a schematic elevational view partly in section of an additional embodiment of a cell in accordance with the invention.

In the embodiment shown in FIG. 6, the battery cell 230 is similar to the cells shown in FIGS. 4 and 5 except for the fact that battery cell 230 is inverted with the anode chamber 228 being in an upper position and the cathode chamber 232 being in a lower position. An anode housing or container 234 forms the anode chamber 228 which contains an anolyte 238, and has an anode lead 48 projecting outwardly through an upper portion of such housing. The separator bundle 10 is sealed to an inner surface of the anode housing 234 by suitable sealing glass 250 to form a glass-to-metal seal when the anode container 234 is formed of a suitable metal. The closed sealed off ends 18 of the hollow fibers forming bundle 10 project upwardly within anolyte 238 retained within anode container 234, with the separator bundle 10 being sealed about the periphery of the solid sealing mass 26 adjacent the open ends 20 of the fibers 12 to the anode housing adjacent a mouth portion thereof.

The cathode container or housing 236, which may be of a suitable metal, is formed with a double wall construction such that the anode chamber 228 is positioned partially within a recessed or hollow inner portion 74 formed by an inner wall 76 of the cathode housing 236. Although the anode housing 234 and the cathode housing 236 may be formed of a suitable metal such as stainless steel or a glass or glass-ceramic material as desired, when the housings are both formed of metal as shown in FIG. 6, an insulating and sealing collar 78 of suitable glass or glass-ceramic material is utilized to seal the outer wall of anode housing 234 to the inner wall 76 of cathode housing 236.

The hollow interiors of the capillary fibers or tubes 12 communicate with the cathode chamber 232 having a catholyte 240 retained therein. In view of the fact that the upper level 241 of the catholyte is maintained at a height above the closed ends 18 of the fibers 12, the hollow interiors 22 of the fibers are supplied with catholyte 240 through open ends 20 of the fibers 12 which are in open communication with cathode chamber 232. In addition, a plurality of current collector wires 24, which are surrounded by the catholyte 240 within the hollow fibers 12, extend outwardly from the open ends 20 of such fibers and are combined together into a common collector 42 which is attached by means of connecting strap 46 to cathode housing 236 which functions as a cathode lead.

The battery cell embodiments shown in FIGS. 4, 5 and 6 all operate in the same manner as the battery cells disclosed in the previously mentioned U.S. prior art, but are distinctive from such known cells in the fact that no tubesheet as such is required in the present embodiments due to the fusing of the individual hollow fibers or capillary tubes together adjacent their open ends with the same glass as the fibers so as to seal off the interstices therebetween without producing deleterious expansion mismatch, and further by the fact that the anode chamber is exterior to the bundled open-ended hollow fibers, rather than interiorly thereof as disclosed by such prior art devices. The embodiments shown in FIGS. 4, 5 and 6 are also distinctive from the cells shown in the previously mentioned published U.K. patent application in that the hollow interiors of the fibers in the present embodiments are in open communication with each other and the cathode chamber through their open ends which are surrounded solely about their outer wall surfaces with a sealing mass forming a portion of the electrolyte/separator between the cathode and anode chambers. Further, contact portions of the longitudinal extent of adjacent fibers beyond the sealing mass are sealed together to form a structurally sound fiber bundle, and the open ended fibers eliminates the need for a plurality of minute glass-to-metal seals in critical areas as required by the U.K. application.

In operation of the battery cells of the present invention, as current is drawn from the battery the molten alkali metal anode gives up electrons and forms the corresponding metal ions. The electrons go through an external circuit doing work while their resultant alkali metal ions diffuse or otherwise are transported through the thin wall electrolyte/separator 10 and migrate toward the cathode. At the molten cathode, electrons are fed into the cathode chamber through the cathode lead from the external circuit forming anions with the molten cathode material, for example sulfur. These anions are, in effect, neutralized by reaction with the alkali metal ions migrating through the electrolyte/separator bundle 10 thereby forming the alkali metal salt. This reaction continues through the discharge cycle of the battery.

To recharge the battery, a source of current is attached to the leads so as to feed electrons through the anode lead to the molten sodium anode and the positive lead from the power source is attached to the cathode lead of the battery. As the voltage of the power source is increased over the battery voltage, the exact reverse of the electrode reaction presented for the discharge cycle takes place. That is, alkali metal ions pass through the separator (bundle 10), and alkali metal is regenerated and the reduced cathode material is oxidized to its original state. An unexpected advantage of the present system particularly when utilizing the sodium-sodium sulfide sulfur electrodes, over that achievable with conventional lead-acid storage batteries, is that much more rapid recharging of the battery can be carried out without any adverse effects.

Figure 7:
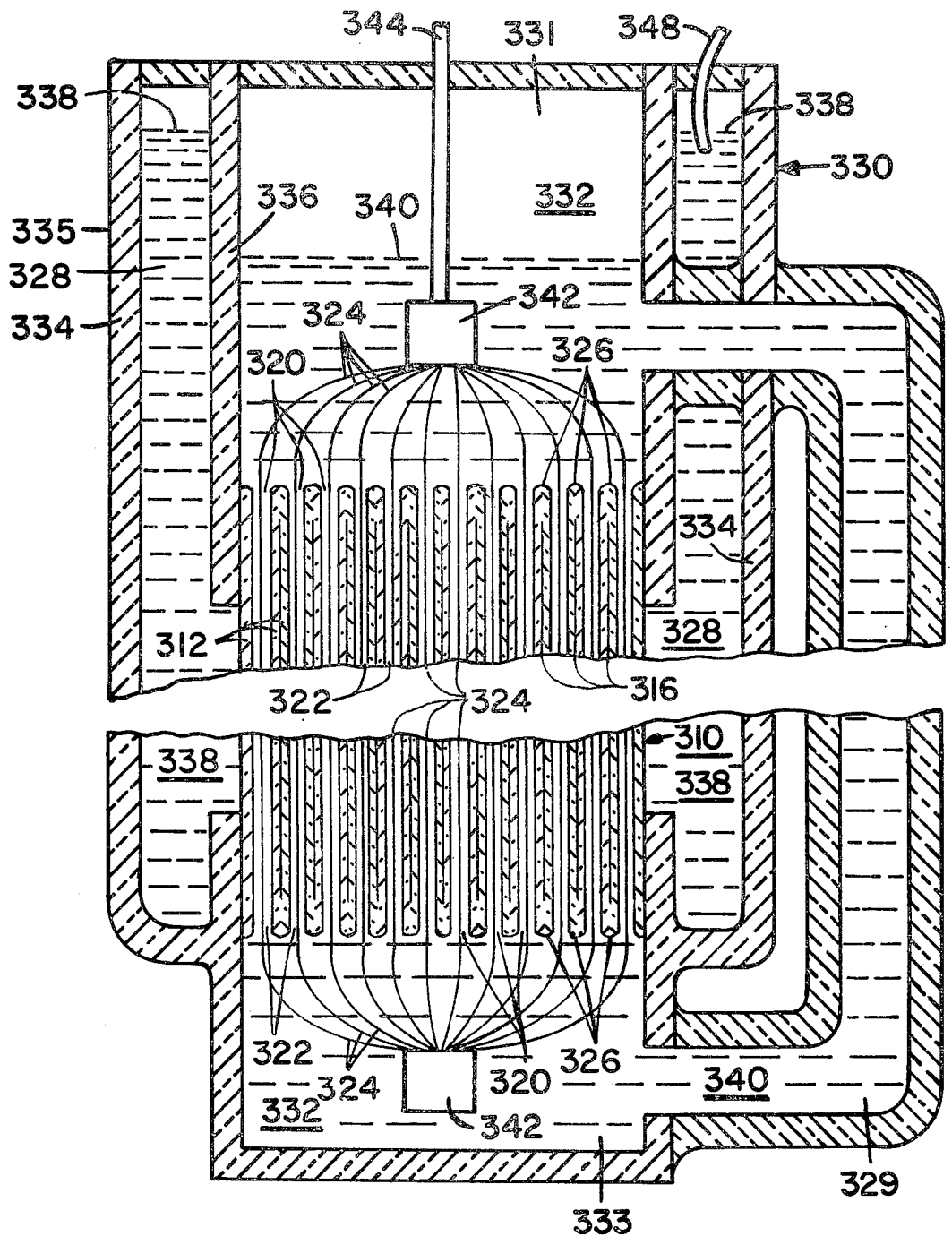
FIG. 7 is a schematic sectional view in elevation of a still further embodiment of a cell in accordance with the invention.

Referring now to FIG. 7, a further embodiment of a battery cell is shown having the anolyte exteriorly of the capillary tubes forming the electrolyte/separator and the catholyte interiorly of such tubes, which facilitates increased circulation of the catholyte within the capillaries or hollow interiors of the electrolyte tubes. The battery cell 330 is formed of a composite glass or glass-ceramic housing 335 which includes an inner cathode housing 336 for cathode chamber 332 surrounded by an outer anode housing 334 forming anode chamber 328. In this embodiment the separator bundle or electrolyte 310 is in the form of a plurality of loosely packed hollow fibers or capillary tubes 312 having open spaces or interstices 316 therebetween. The longitudinal extent of open spaces 316 between the capillary tubes 312 are closed-off by being fused or sealed together into a solid sealing mass 326 at each end of the tubes 312. The hollow interior 322 of each of the tubes 312 extends completely therethrough and has opposed open end portions 320. A suitable cathode current collector 324, such as protectively coated aluminum wire, extends through each of said hollow interiors 322 and such wires are joined together at their ends by common electrode connectors 342. A suitable cathode lead 344 extends outwardly of the cell 330 for connecting the same to an external electrical circuit.

It will be appreciated that all schematic representations of the hollow fibers or capillary tubes are greatly enlarged for purposes of illustration, since the diameter of the tubes per se may be in the range of about 0.003" to 0.1" and may have wall thicknesses of only about 0.0005", and thus it can be seen that thermal circulation or flow of the catholyte within the hollow fibers or capillary tubes could be somewhat restricted. Thus, in order to facilitate such flow, should it be desired, the cell 330 includes a recirculating tube 329 connecting an upper portion 331 of the cathode chamber 332 with a lower portion 333 of said cathode chamber, so that a catholyte 340 may readily flow through the hollow interiors 322 of capillary tubes 312 and recirculate through tube 329 as a result of temperature dependent density variation within the cell, or actual pumping. The anolyte 338 within anode chamber 328 flows about the outer walls of the loosely nestled and centrally unconnected capillary tubes 312. Solid sealing masses 326, sealing the open spaces 316 between the tubes at opposite ends thereof, function to separate the anolyte which flows about the outer walls of the tubes from the catholyte which flows through the hollow interiors thereof. An anode lead 348 extends outwardly from the anode chamber for connection with an external electrical circuit. The battery cell 330 functions in the same manner as battery cells 30, 130 and 230 as set forth hereinbefore, and sets forth a further embodiment wherein the anolyte is located exteriorly of the capillary tubes and the catholyte interiorly thereof, which is the reverse of the conventional sodium sulfur battery.

While various methods may be utilized to form the separator bundle 10 of the present invention, the presently preferred methods are shown in FIGS. 1, 2 and 8–13. In the embodiment shown in FIGS. 1 and 2, a plurality of hollow fibers or capillary tubes are initially sealed off at one end, such as by flame sealing, like the closed end of a test tube. The sealed off capillary tubes are then stacked or nested into a bundle and are sealed together along contact portions through the use of heat and slight pressure. The sealing which is affected along portions of the length of each fiber or capillary tube need not be continuous, but should be strong enough to give the separator bundle sufficient mechanical integrity to not only withstand subsequent handling but also normal operational abuse. The unsealed or open end of the bundle is then flash heated to seal off the spaces or interstices between the hollow fibers adjacent the open ends so as to form a solid sealing mass about the outer walls of the fibers while maintaining the open ends thereof. The open face of the bundle may be ground flat prior to the sealing off of the interstices and, if desired, powdered glass of the same composition as the fibers may be provided within the interstices to facilitate the sealing off thereof.

Figure 8:
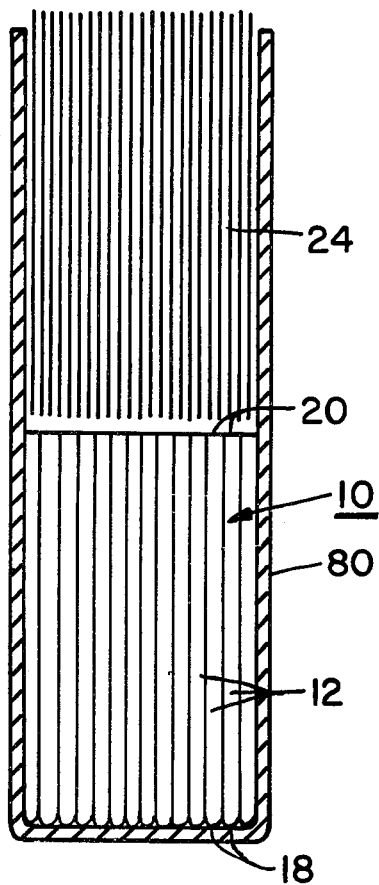
FIG. 8 is a schematic view illustrating one method of positioning the electrode collector wires within the capillaries of the bundled hollow fibers or capillary tubes.

The electrode collector utilized within the hollow interiors of the fibers or capillary tubes is preferably formed of a plurality of aluminum wires having a protective coating such as molybdenum disulfide which are inserted within the open ends of such tubes. One method of inserting such wires is shown in FIG. 8 wherein a separator bundle 10 is positioned within a container 80 with the closed or sealed ends 18 of the fibers or tubes 12 at the bottom and the open ends 20 at the top. A plurality of precut protectively coated aluminum wires having a diameter slightly larger than ½ the inside diameter of the hollow interior of the tubes 12 are placed as a loose bundle of aluminum wires 24 over the separator bundle 10. The container 80 is then vibrated in a vertical direction causing a single wire 24 to fall into the hollow interior 22 of each fiber or capillary tube 12 through its open end 20.

Figure 9:
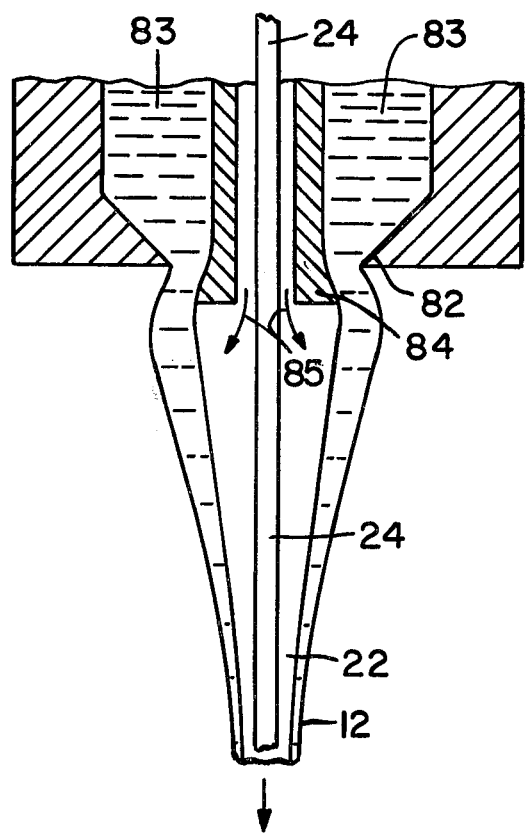
FIG. 9 is a schematic elevational view in section illustrating a method of forming the capillary tubes with a collector wire therewithin.

In view of the problems which may be encountered in positioning the aluminum wires within the interiors of the capillary tubes, a further embodiment is shown in FIG. 9 wherein the current collector wire 24 is inserted within the hollow interior 22 while the hollow fiber or capillary tube 12 is being drawn. A small Vello orifice 82 is shown having molten glass 83 flowing downwardly about a standard bell 84 having the aluminum wire 24 fed downwardly therethrough with air or inert gas represented by arrows 85 utilized to maintain the hollow interior.

Figure 10:
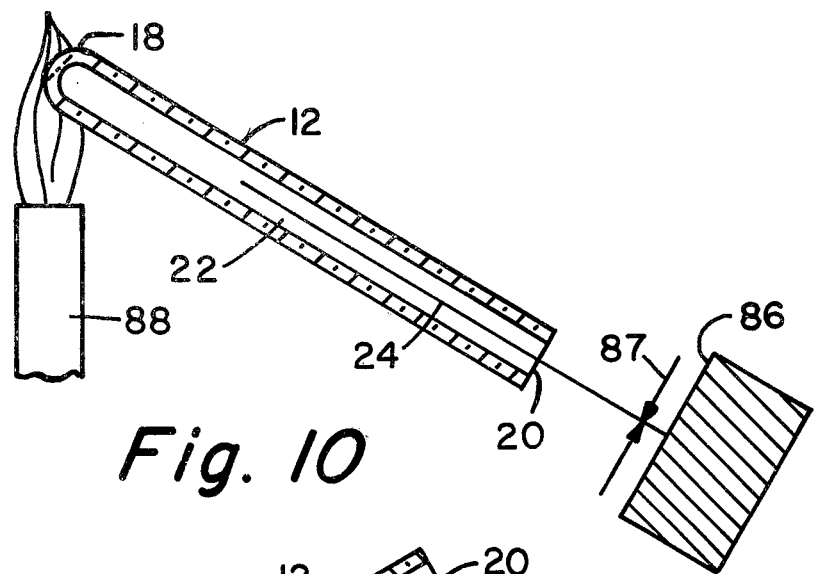
FIGS. 10, 11 and 12 are schematic illustrations for forming the capillary bundle from the tubular members drawn in accordance with the process of FIG. 9.

Although the temperatures of the molten glass 83 flowing through the orifice is relatively high compared to the melting point of aluminum, the aluminum wire would be traveling at a rate sufficient to avoid overheating and may even function to supply beneficial internal cooling in the forming zone. The thus formed tubing with the aluminum wire therein is collected upon a suitable winding reel and the friction exerted between the wire and the inside diameter of the capillary tube would be sufficient to pull the wire through the bell or air tube 84 during forming. The thus formed capillary tube with the wire therein is then cut to desired lengths and each fiber or capillary tube 12, as shown in FIG. 10, is positioned at an inclined angle at a given distance from a stop surface 86. Accordingly, the wire 24 retained within the hollow interior 22 of the tube 12 slides outwardly through the opened end 20 into stop abutment with the stop surface 86 and the wire cut at a predetermined location noted by cutting arrows 87. Simultaneously, a burner 88 flame seals the opposite end into a closed or sealed off end 18 similar to the closed end of a test tube.

Figure 11:
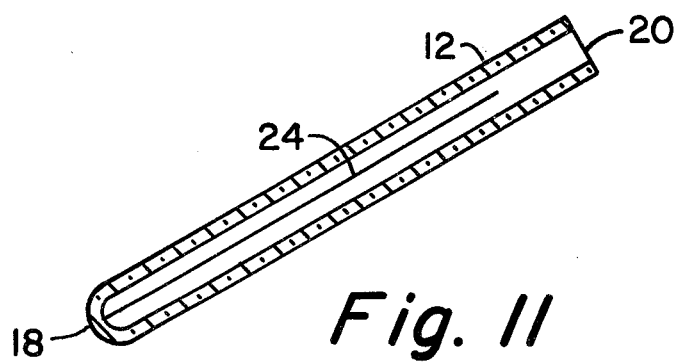
Figure 12:
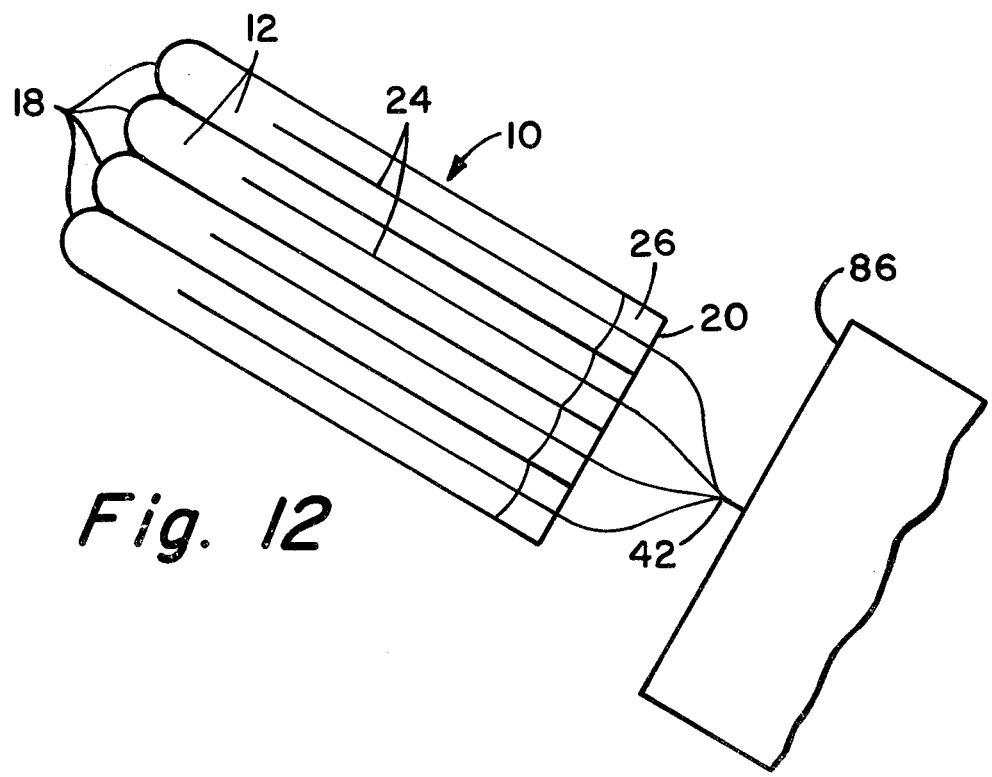

After cutting the collector wire 24 to desired length and sealing the end 18 of each capillary tube 12, the fiber or tube is tilted backwardly as shown in FIG. 11 so that the collector wire 24 slides downwardly within the hollow interior 22 toward the closed or sealed off end 18. A plurality of such fibers containing the shortened wires are then nested and sealed together along their contact areas while retained in a closed-end-down position and the upper open end 20 of the resulting bundle 10 of fiber 12 could be ground flat if desired and the interstices between adjacent tubes flash fired and sealed together to form a solid sealing mass 26 without affecting the open ends or the collector wires resting adjacent the lower sealed ends 18 of the tubes. The bundle 10 is then positioned as shown in FIG. 12 at a given distance from a stop surface 86 so that the collector wires 24 slide outwardly of open ends 20 and abut against the stop surface, where upon the outer ends of such wires are crimped together to form a common electrode connector 42.

Figure 13:
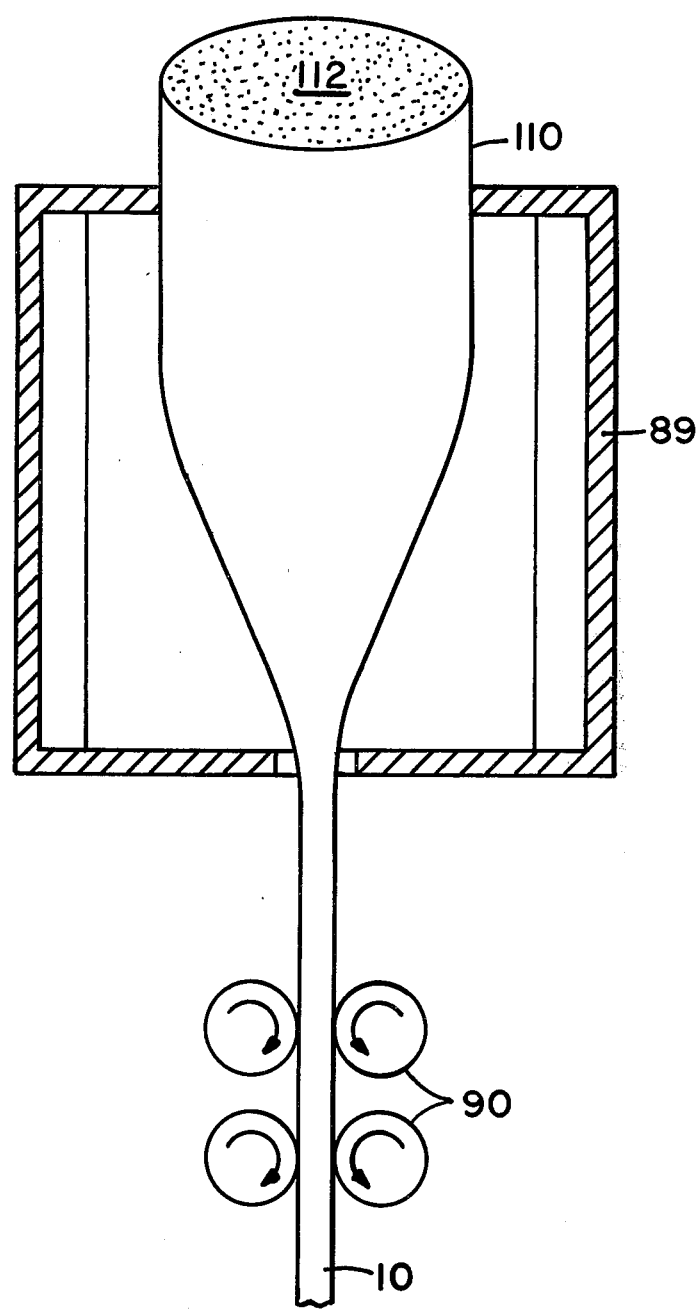
FIG. 13 is a schematic elevational illustration partially in section showing a further method of forming the capillary bundles of the present invention.

As a further alternative as shown in FIG. 13, a large bundle 110 of relatively large diameter hollow fibers or capillary tubes 112 are fused together and reheated and redrawn through a redraw furnace 89 and attenuated by suitable rollers 90 into a final bundle 10 of hollow fibers or capillary tubes 12 of desired diameter. For example, the tubes 112 may have a diameter of about 0.1" and a wall thickness of about 0.006", whereas the capillary fibers of bundle 10 may have a diameter of about 0.01" and a wall thickness of about 0.0006". The drawn bundle 10 is cut into desired lengths, one end sealed, and the current collector wires 24 inserted in a manner such as shown in FIG. 8. As an alternative, the aluminum wire could be inserted through each of the tubes 112 from reels prior to being redrawn and fixed to the lower end of bundle 110, and then unwound from the various reels as the bundle 110 is being elongated. Further, if desired, a single relatively large hollow blank could be provided with a central wire means and redrawn down to desired fiber size while feeding the wire therethrough.

Although I have disclosed the now preferred embodiments of my invention, it will be appreciated that various changes and modifications may be made thereto without departing from the spirit and scope thereof as defined in the appended claims.

I claim:

1. A battery cell for generating electrical energy which comprises, container means having anode and cathode chambers, said anode and cathode chambers being separated by a combination electrolyte/separator, said electrolyte/separator being in the form of a bundle of hollow fibers having inner and outer surfaces positioned substantially parallel to one another along their longitudinal extent, the interiors of said hollow fibers being open at one end of said separator bundle and sealed closed at the opposite end thereof, said hollow fibers forming said separator bundle having interstices formed along their outer longitudinal surfaces between adjacent hollow fibers, wall portions of adjacent hollow fibers forming said separator bundle being sealed together adjacent the open end thereof forming a solid sealing mass of the same composition as said hollow fibers closing off the interstices between said hollow fibers adjacent their open ends, the outer surfaces of said hollow fibers extending into one of said chambers with the interior of said hollow fibers being closed off therefrom by said sealed ends, the inner surfaces of said hollow fibers being in open communication with each other and the other chamber with the open ends of such hollow fibers opening into said other chamber, an anolyte communicating with one surface of said separator bundle, a catholyte communicating with an opposite surface of said separator bundle, longitudinally extending cathodic current collecting means within said container means extending substantially along the length of said hollow fibers and surrounded over a major portion of its extent by said catholyte, and anodic current collecting means.

2. A battery cell for generating electric energy as defined in claim 1 wherein adjacent hollow fibers within said bundle have longitudinally extending contacting outer surface portions, and said contacting outer surface portions being sealed together beyond said solid sealing mass at least along a portion of their longitudinal extent.

3. A battery for generating electric energy as defined in claim 1 wherein said hollow fibers are formed of a glass or glass-ceramic material and said solid sealing mass, in conjunction with said hollow fibers separating said anode and cathode chambers, being of the same composition as said hollow fibers.

4. A battery cell for generating electrical energy as defined in claims 1 or 2 wherein said cathodic current collecting means includes a plurality of wires extending longitudinally along the substantial extent of the interiors of said hollow fibers, and extending outwardly through the open ends thereof.

5. A battery cell for generating electrical energy as defined in claim 4 wherein one said wire is positioned within and extends substantially along the interior of each hollow fiber, and said wires are joined together in said cathode chamber.

6. A battery cell for generating electrical energy as defined in claim 4 wherein said cathodic current collecting means is in the form of a plurality of protectively coated aluminum wires.

7. A battery cell for generating electrical energy as defined in claims 1 or 2 wherein the outer surfaces of said hollow fibers extend into said anode chamber, and the inner surfaces of said fibers are in open communication with said cathode chamber.

8. A battery cell for generating electrical energy as defined in claims 1 or 2 wherein said anolyte is within said anode chamber about the outer surfaces of said hollow fibers and within the interstices formed between adjacent fibers, and said catholyte is within the hollow interiors of said hollow fibers forming said separator bundle, which interiors are open to said cathode chamber.

9. A battery cell for generating electrical energy as defined in claim 8 wherein said cathodic current collecting means includes a plurality of wires with one such wire being longitudinally positioned within the hollow interior of each fiber forming said separator bundle and extending outwardly through the open end thereof, and each said wire being surrounded with the catholyte being retained within the interior of such hollow fiber.

10. A battery cell for generating electrical energy as defined in claims 1 or 2 wherein said container means includes an anode housing enclosing said anode chamber and a cathode housing enclosing said cathode chamber, said housings being vertically positioned with respect to one another, means sealing said housings together in a fluid tight relationship, and said solid sealing mass being sealed about its periphery to an inner surface of one of said housings substantially at the same vertical elevation within said container means at which said sealing means seals said housings together.

11. A battery cell for generating electrical energy as defined in claim 10 wherein said cathode housing has a hollow interior and a major portion of said anode housing is positioned within said hollow interior such that the upper surface of the catholyte within said cathode housing is above the vertical extent of said hollow fibers forming said separator bundle.

12. A battery cell for generating electrical energy as defined in claim 1 wherein said container means includes an anode housing and a cathode housing, said solid sealing mass being sealed in an opening to said anode housing and separates said anode chamber from said cathode chamber, and the interiors of said hollow fiber being in open communication with each other and said cathode chamber through said open ends.

13. A battery cell for generating electrical energy which comprises, container means having anode and cathode chambers wherein the anode and cathode chambers are separated by a combination electrolyte/separator, said electrolyte/separator being in the form of a loosely packed bundle of hollow fibers having inner and outer surfaces positioned substantially parallel to one another along their longitudinal extent, the interiors of said hollow fibers being open at both ends of said separator bundle, said hollow fibers forming said separator bundle having interstices formed along their outer longitudinal surfaces between adjacent fibers, wall portions of adjacent fibers forming said separator bundle being sealed together adjacent the open ends thereof forming a solid sealing mass of the same composition as said fibers and closing off the interstices between said fibers adjacent their open ends, the outer surfaces of said hollow fibers intermediate said solid sealing masses extending within one of said chambers with the interior of said fibers being closed off therefrom by said solid sealing masses, the inner surfaces of said fibers being in open communication with the other chamber and with the open ends of such fibers opening into separated portions of said other chamber, an anolyte within said anode chamber and communicating with one surface of said separator bundle, a catholyte within said cathode chamber and communicating with an opposite surface of said separator bundle, and longitudinally extending cathodic current collecting means within said container means extending substantially along the length of said hollow fibers and surrounded over a major portion by said catholyte.

14. A battery cell for generating electrical energy as defined in claim 13 wherein said hollow fibers are formed of a glass or glass-ceramic material and the solid sealing masses at each open end thereof which separate the anode and cathode chambers are formed of the same composition as said hollow fibers.

15. A battery cell for generating electrical energy as defined in claim 13 wherein said cathodic current collecting means includes a plurality of wires extending through the interiors of said hollow fibers.

16. A battery cell for generating electrical energy as defined in claim 15 wherein a protectively coated aluminum wire extends through the interior of each of the hollow fibers forming said separator bundle, and said aluminum wires being connected together into a common electrode connector.

17. A battery cell for generating electrical energy as defined in claim 13 wherein the outside surface of said hollow fibers extends within said anode chamber and an anolyte flows through the interstices formed along the outer longitudinal surfaces between adjacent fibers, and the inner surfaces of said fibers being in open communication with separated portions of said cathode chamber.

18. A battery cell for generating electrical energy as defined in claim 17 wherein a conduit communicates between said separated portions of said cathode chamber and a catholyte circulates through said conduit and through the interiors of said hollow fibers which are in open communication with said separated portions of said cathode chamber.

* * * * *